(12) United States Patent
Pong et al.

(10) Patent No.: US 6,219,448 B1
(45) Date of Patent: Apr. 17, 2001

(54) THREE-STROKE CHINESE DICTIONARY

(76) Inventors: Gim Yee Pong; Wai Jean Pong, both of 45-11 156th St., Flushing, NY (US) 11355

( * ) Notice: Subject to any disclaimer, the term of this patent is extended or adjusted under 35 U.S.C. 154(b) by 0 days.

(21) Appl. No.: 09/340,174

(22) Filed: Jun. 25, 1999

(51) Int. Cl.$^7$ .................................................. G06K 9/18
(52) U.S. Cl. .............................. 382/185; 382/226; 707/6; 707/102
(58) Field of Search .............................. 382/185–187, 382/195, 202, 209, 225, 226, 227, 228, 230; 707/3–6, 102

(56) References Cited

U.S. PATENT DOCUMENTS

| | | | |
|---|---|---|---|
| 4,758,979 | * 7/1988 | Chiao-Yueh ........................ | 382/185 |
| 4,862,281 | * 8/1989 | Sateo et al. ........................ | 358/400 |
| 5,119,296 | * 6/1992 | Zheung et al. ..................... | 707/535 |
| 5,187,480 | * 2/1993 | Thomas et al. ..................... | 341/22 |
| 5,212,769 | * 5/1993 | Pong ................................... | 345/467 |
| 5,360,343 | * 11/1994 | Tang ................................... | 434/118 |
| 5,410,306 | * 4/1995 | Ye ...................................... | 341/28 |
| 5,844,561 | * 12/1998 | Tanimoto et al. .................. | 345/357 |
| 5,940,532 | * 1/1999 | Tanaka ............................... | 382/185 |

* cited by examiner

Primary Examiner—Andrew W. Johns
Assistant Examiner—Gregory Desire
(74) Attorney, Agent, or Firm—Cobrin & Gittes (57) ABSTRACT

A method of using a Chinese dictionary, including the steps of (a) selecting a stroke type of a first stroke of a principal root in a desired Chinese Character from among a corresponding stroke group found in a root table, the stroke group being a horizontal stroke, a vertical stroke and a slant stroke, the root table containing a root for the desired Chinese character together with a page where the desired Chinese character is found in the Chinese dictionary, (b) identifying the page from the root table that is associated with the selected stroke type of the first stroke, (c) selecting a stroke type of a first stroke in the secondary root from among the corresponding stroke group, (d) finding on the page a list of Chinese characters associated with the selected stroke type of the first stroke in the secondary root, (e) selecting stroke types of the next one or two strokes in sequence in the secondary root from among the corresponding stroke group, (f) finding a subsidiary list of Chinese characters from the list that are associated with the selected stroke types of the next one or two strokes, and (g) identifying the desired Chinese character within the subsidiary list of Chinese characters.

3 Claims, 8 Drawing Sheets

| Root SUN | 日 | 日 | 日 | 日 | 日 |
|---|---|---|---|---|---|
| combined with | 月 | 日日 | 干 | 十 | 生 |
| became | 明 | 晶 | 旱 | 早 | 星 |
| Meaning | clear | crystal | dry season | morning | star |
| Root GIRL | 女 | 女 | 女 | 女 | 女 |
| combined with | 馬 | 且 | 女女 | 日日 | 氏日 |
| became | 媽 | 姐 | 姦 | 娼 | 婚 |
| Meaning | mother | older sister | illegal love | prostitute | marriage |
| Root MOUTH | 口 | 口 | 口 | 口 | 口 |
| combined with | 欠 | 勿 | 隹 | 口日 | 口犬 |
| became | 吹 | 吻 | 售 | 唱 | 哭 |
| meaning | blow | kiss | sell | sing | cry |

| Root SUN | 日 | 日 | 日 | 日 | 日 |
|---|---|---|---|---|---|
| combined with | 月 | 日日 | 干 | 十 | 生 |
| became | 明 | 晶 | 旱 | 早 | 星 |
| Meaning | clear | crystal | dry season | morning | star |
| Root GIRL | 女 | 女 | 女 | 女 | 女 |
| combined with | 馬 | 且 | 女女 | 日 | 氏日 |
| became | 媽 | 姐 | 姦 | 娼 | 婚 |
| Meaning | mother | older sister | illegal love | prostitute | marriage |
| Root MOUTH | 口 | 口 | 口 | 口 | 口 |
| combined with | 欠 | 勿 | 隹 | 口日 | 口大 |
| became | 吹 | 吻 | 售 | 唱 | 哭 |
| meaning | blow | kiss | sell | sing | cry |

〈一〉 GROUP 組

——二示舌干玉青无支 –ㄧ– 士土赤老走鼓工匚冂臣ㅋ

Pages to be assigned

ㄱㄴ 己尸弓艮韋聿隶 –ㄧㄧ 甘革黃耳 –ㄧㄱ 両雨酉車豆

Pages to be assigned

–ㄧ／ 木才寸羽ㄗ又子疋皮矛阝爻厂乙刀力 –ㄧ／ 石歹至

Pages to be assigned

而面頁瓦豕冫尢廾　–ㄧ丶 大夫麥 –ㄧ丶 弋戈飛

Pages to be assigned

〈｜〉 GROUP 組

ㅣ／ ｜亅卜小水比 ㅣ– 支止卢鹵齒片韭ㅣㄴㅣ 山山屮艹

Pages to be assigned

ㅣㄱ– 口囗曰足邑虫＊日目見貝鼎＊田里黑黽骨＊門鬥皿

Pages to be assigned

」ㄱ 巾肉肉网尸ㅣ—— 長彡馬

Pages to be assigned

〈／〉 GROUP 組

／／ 斤爪瓜舟彳行宀穴 ／丶 人入八女谷金食丶／– 非米首斗辶

Pages to be assigned

／——矢气缶牛生耒手毛 ／–ㅣ 竹香黍／–– 毋非几勹戶禾風殳

Pages to be assigned

丿ㄱ 月用、– 一广疒文立方辛衣言玄高音龍麻鹿齊 ／ㄱ 夂

Pages to be assigned

欠夕歹色角魚龜一 ／ㅣ 隹白自臼血鬼身鳥鼠鼻阜氏片儿

Pages to be assigned

丶丶／ ﾝ厶氵彡采

Pages to be assigned

／囗火父爻幺心巛 糸鬯豸

Pages to be assigned

| | | | | | | | | | | | | | |
|---|---|---|---|---|---|---|---|---|---|---|---|---|---|
| 刁 | 刀 | 几 | 八 | 入 | 人 | 二 | 了 | 九 | 乃 | 七 | 丁 | 二畫 | 乙 一畫 |
| 七七 | 七七 | 充 | 六 | 吾 | 三 | 七 | 六 | 三 | 六 | 六 | | 二五 | |
| 么 | 久 | 凡 | 丸 | 丫 | 上 | 丈 | 下 | 三 | 三畫 | 又 | 卜 | 十 亡 匕 力 | |
| 三二 | 三二 | 三一 | 三一 | 三一 | 三一 | 三〇 | 三〇 | 二九 | | 九七 | 九二 | 九〇 八七 八六 | |
| 子 | 孑 | 女 | 大 | 夕 | 士 | 土 | 口 | 叉 | 千 | 勺 | 刃 | 兀 亡 于 乞 也 | |
| 一四四 | 一四三 | 一四〇 | 一三五 | 一三四 | 一三三 | 一三二 | 一二〇 | 一〇九 | 一〇八 | 一〇六 | 九七 | 八五 七九 七六 七五 | |
| 不 | 丐 | 丑 | 四畫 | 才 | 弋 | 弓 | 干 | 巾 | 已 | 巳 | 己 | 工 川 山 寸 | |
| 三二 | 三二 | 三一 | | 一九七 | 一四四 | 一四四 | 一四三 | 一三六 | 一三七 | 一三七 | 一三七 | 一三五 一四四 一四六 一四四 | |
| 內 | 允 | 元 | 今 | 介 | 仍 | 仇 | 什 | 仆 | 仁 | 兀 | 五 | 互 井 云 予 尹 之 丹 中 |
| 六〇 | 五五 | 五五 | 五三 | 五三 | 五三 | 五三 | 五三 | 五三 | 五三 | 四九 | 四九 | 四九 四七 四七 四一 四一 三一 三一 二九 |
| 太 | 天 | 壬 | 反 | 及 | 友 | 厄 | 卡 | 卅 | 升 | 午 | 匹 | 化 刈 切 分 凶 公 兮 六畫 |
| 一〇三 | 一〇三 | 一〇五 | 九九 | 九九 | 九六 | 九三 | 九二 | 九一 | 九一 | 九一 | 八七 | 八七 七三 七三 七三 六九 六〇 六〇 |
| 止 | 欠 | 无 | 方 | 斤 | 斗 | 文 | 支 | 戶 | 戈 | 弔 | 廿 | 幻 巴 屯 尺 少 孔 夭 夫 |
| 四〇六 | 四〇二 | 三五三 | 三五二 | 三五二 | 三五二 | 三五二 | 二九六 | 二九五 | 二四四 | 一四三 | 一四三 | 一四一 一三九 一三〇 一三〇 一二三 一四四 一〇八 一〇六 |
| 丘 | 且 | 丕 | 世 | 丙 | 五畫 | 王 | 犬 | 牛 | 牙 | 片 | 父 | 爪 氏 毛 比 冊 殳 歹 |
| 三六 | 三六 | 三一 | 二七 | 二七 | | 四八四 | 四八七 | 四八二 | 四八二 | 四八二 | 四八〇 | 四七一 四七一 四六〇 四四一 五一 四一七 四一三 |

Fig.4

| 字畫 Strokes | ＜ 一 組 ＞ (Group) |
|---|---|
| 一 一 | 示云元次干王舌甜未末王于井无天夫替鼇玉現班碧琴琶斑琺 |
| 一 一 一 | 三弄責毒表素青靜春奏奉秦 |
| 一 丨 | 十支卉古克直南幸胡競哉裁截 乾朝幹博協 |
| 一 丨 一 | 土士吉去寺幸志斡韓翰赤卦袁喜堯壹壺臺鼓賣報執嘉壽赦穀戴懿載馨老考者孝匚 |
| 一 丨 丨 | 廿甘某革黃燕共巷恭曹耳取聖聚聽其甚基世 |
| 一 ㄱ 一 | 聿書畫畵肅帚尋尹群夷妻 |
| 一 丨 ㄱ | 西票覆 吏束事囊喪 噩東專斬柬市 |
| 一 丨 ノ | 木本相彬婪梵楚禁麓鬱樊隸寸才 |
| 一 丨 ㄱ | 再兩棘棗整賴 |
| ㄱ 一 | 己已巳尺尼尾局犀辟巴弓弱弭弼粥疆弔弗丑民即既 |
| ㄱ ㄱ | 司羽翟 |
| ㄱ | 又了子孑孔孜孟函承疏予矛柔甬勇務凳疋皮頗及孕也乙兀 |
| 一 ノ | 反厄 辰厚厚曆歷辱壓歹百而面耍耐夏憂死殉瓦互亙至致五牙布右在存灰尬 |
| 一 ノ 乀 | 大丕布歪奈奔奮灰奢夾丈不充牽率麥爽嗇來 |
| 一 乀 | 戈式成戌戒成戒或咸威戚弋貳 |
| ㄱ ノ | 刀刃刁力召架乃 |
| ＜ 丨 ＞ 組 Group | |
| 丨 一 | 上卡占貞卓叔盧餐虧膚慮止步肯歧此些齒柴歲 |
| 丨 一 丨 | 凶兇山出炭豈崇凱髓豐韭壯妝將狀漿 |

THREE-STROKE CHINESE DICTIONARY

CROSS-REFERENCE TO RELATED PATENT APPLICATIONS

U.S. patent application Ser. No. 09/132,453.

STATEMENT REGARDING FEDERALLY SPONSORED RESEARCH OR DEVELOPMENT

Not Applicable.

BACKGROUND OF THE INVENTION

1. Field of the Invention

This invention is related to a Chinese language dictionary of characters.

2. Description of Related Art

A Character by definition, is a symbol or a picture. The original Chinese characters were actual physical pictures. They were used to record events and to express thoughts. The character SUN was a picture of the sun ☉ and the character MOON was a half-picture of the moon ☽.

After centuries of transformation and simplification, Chinese characters lost their original identities and pictures. The character SUN became 日 and the character MOON became 月 as used today.

Because of the limited supply of pictures and the complexity of some pictures, existing pictures were combined with others to meet the demand for expressing various thoughts and events. The new combined pictures (consisting of a simple character or a root) generally reflected the characteristics of the old ones or instance, the character (CLEAR 明) is derived by combining the characters (SUN 日) and (MOON 月). The sun gives light during the day and the moon gives light at night. Things on earth are always clear because there is light from the sky during the day and night.

Another example is the character (GOOD 好). It is made of the characters (GIRL 女 and BOY 子). The marriage between a body and a girl creates joy, and produces babies that preserves the human race, so this is good. A forest (森) is a place where many tree/wood (木) grow. It can be seen that the Chinese characters were pictures with thoughts drawn together.

Many of the original pictures became the basic building blocks (Roots in today's dictionary) for the Chinese written language. There are 210 roots listed in Root-Table in the Chinese dictionary for finding characters. The majority of these roots are related to the objects that were known by man during the early age of history, such as:

(sun 日), (moon 月), (gold 金), (tree 木), (fire 火), (water 水), (land 土), (glass 单), (fish 魚), (bird 鳥), (insect 虫), (horse 馬), (man 人), (boy 子), and (girl 女).

A "Root" is a simple character and has meaning. It has one or more strokes or other roots such as root SOUND 音 which has roots 立 and 日. A root can be anywhere in a character. By definition, all roots in the Root-Table in a dictionary are the HEAD (部首) of the character (principle root). Root after the HEAD (部首) is BODY (字身) of the character (secondary root). The character HEAD has only one root and BODY may have one or more roots as illustrated below.

Figure 1:
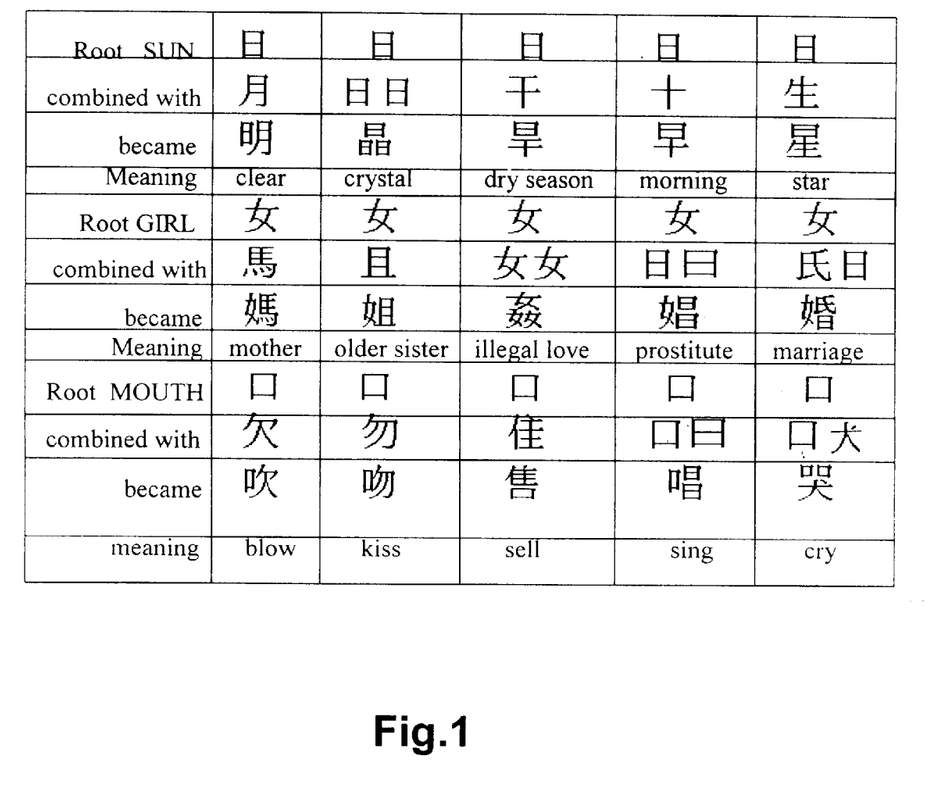
FIG. 1 is a table illustrating combining roots to form characters

With the "roots", other characters were formed by combining with itself or with others root(s). such as shown in the FIG. 1:

The Chinese written language and its writing rules had been invented and used over 5,000 years ago. They were formalized (characters used today) about 3000 years ago. These characters were recorded in a book according their Roots and number of strokes for each root. A Root-Table (Index) shown in FIG. 2, contains all the roots for looking for characters.

To look for a character, the user has to: 1) know what is the head (root) for the character, 2) count the number of strokes in the Root, 3) look for the root in the group of roots with the same number of strokes in the Root-table, 4) go to the page number in the dictionary indicated by the Root-table, 5) count the remaining strokes (without its principal Root) in the character, 6) look for the character where the group of characters with the same strokes are located.

Based on above instructions, one might expect that looking for a character in a Chinese dictionary is clear without obstacles, but it is not. The most difficult obstacle faced in trying to locate a character is the requirement of knowing what is the head of the character.

Although Roots in a dictionary are the head (部首) of the character by definition, some Roots such as 頁, 阝 are actually the last parts of the characters, such as 類願 and 部都.

In addition, some characters have the head and body interchanged, such as 妾. According to the Root-Table, its head is 女 but its first root is 立. By the same token, 唐 whose first root is 广 but 口 is the head root according to the Root-Table.

Furthermore, some characters whose Roots are not recognizable by users with average knowledge of Chinese writing, such as 並承. According to the Root-Table, 並 is with root 一 and 承 is with root 手.

In view of these problems, about 1000 characters are hard to find. These characters are listed under the title "Hard To Find Characters 難檢字" see Table 4 of the Appendix. The characters here are listed by number of strokes and page number, not by roots.

Due to the complexity in looking for characters with the Root-Table, the Root-Table had been revised a few times since its inception. The number of Roots were reduced from about 500 to the 210 in today's Root-Table which was revised in the 1800s.). To use today's Root-table to find characters, however, faces the same problems as before.

By late 1920/early 1930, a new method was invented by Chinese scholars. This method used numerical number 0 to 9 to present the stroke type at each corner of the character. The title for this method was called the "FOUR CORNER METHOD" (U.S. Pat. No. 4,559,615 Adapted this method for a Chinese word-processor).

One of the inventors was impressed with the simplicity to use the "FOUR CORNER METHOD" method to find characters in this new dictionary. However, after continual use, the one inventor found that the new method to find characters was more difficult to use in practice then using the Root-table. Today, the "FOUR CORNER METHOD" is still used by a few dictionaries to supplement the Root-Table.

BRIEF SUMMARY OF THE INVENTION

An advantage from using this three-stroke Chinese dictionary invention is that its users do not have to count the total number of strokes in the principal and secondary root. All the users have to know are the first stroke in the character and the first 1 to 3 strokes of its secondary roots.

DETAILED DESCRIPTION OF THE INVENTION

Figure 2:
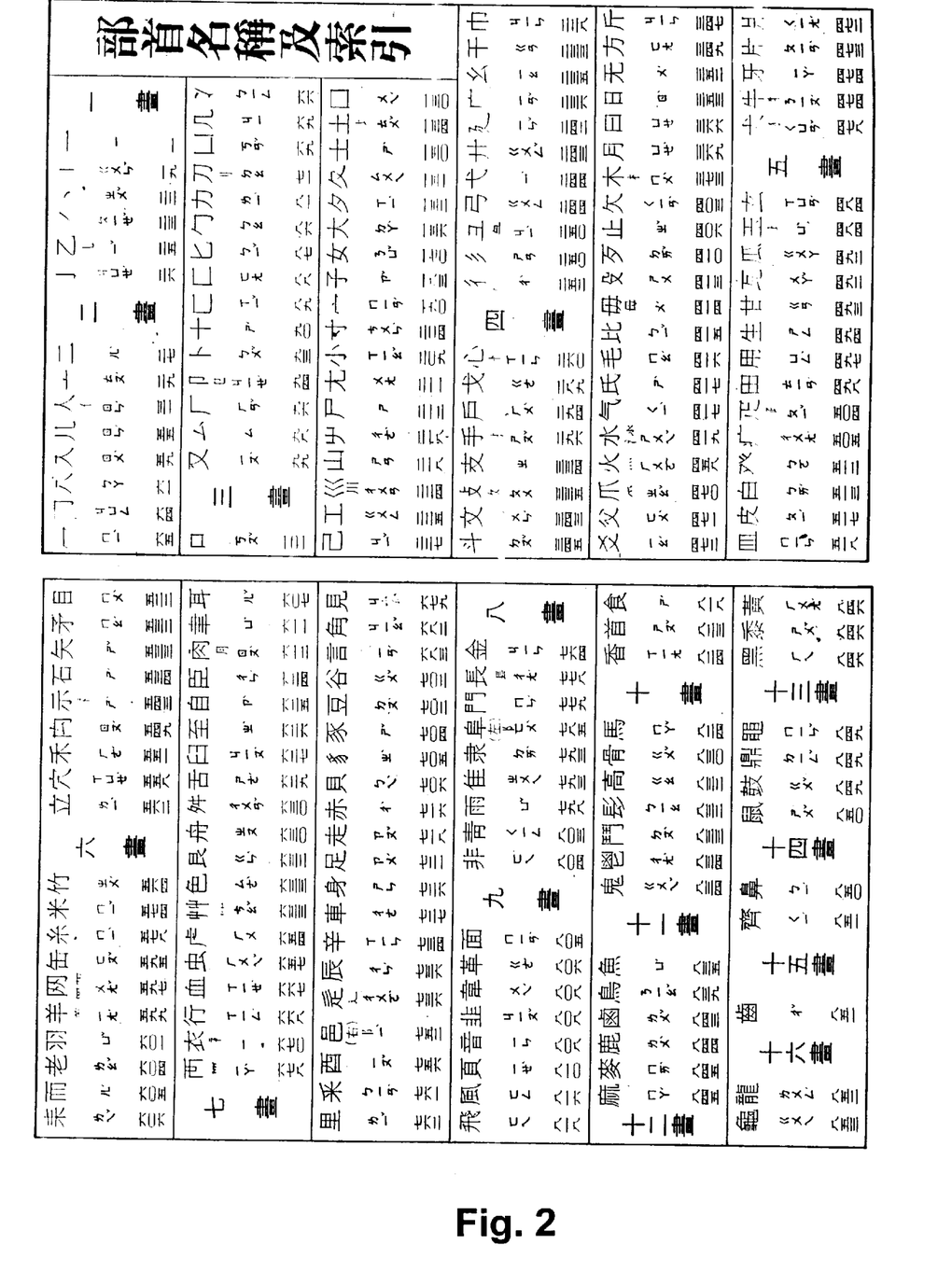
FIG. 2 is a traditional Chinese dictionary root-table index
Figure 4:
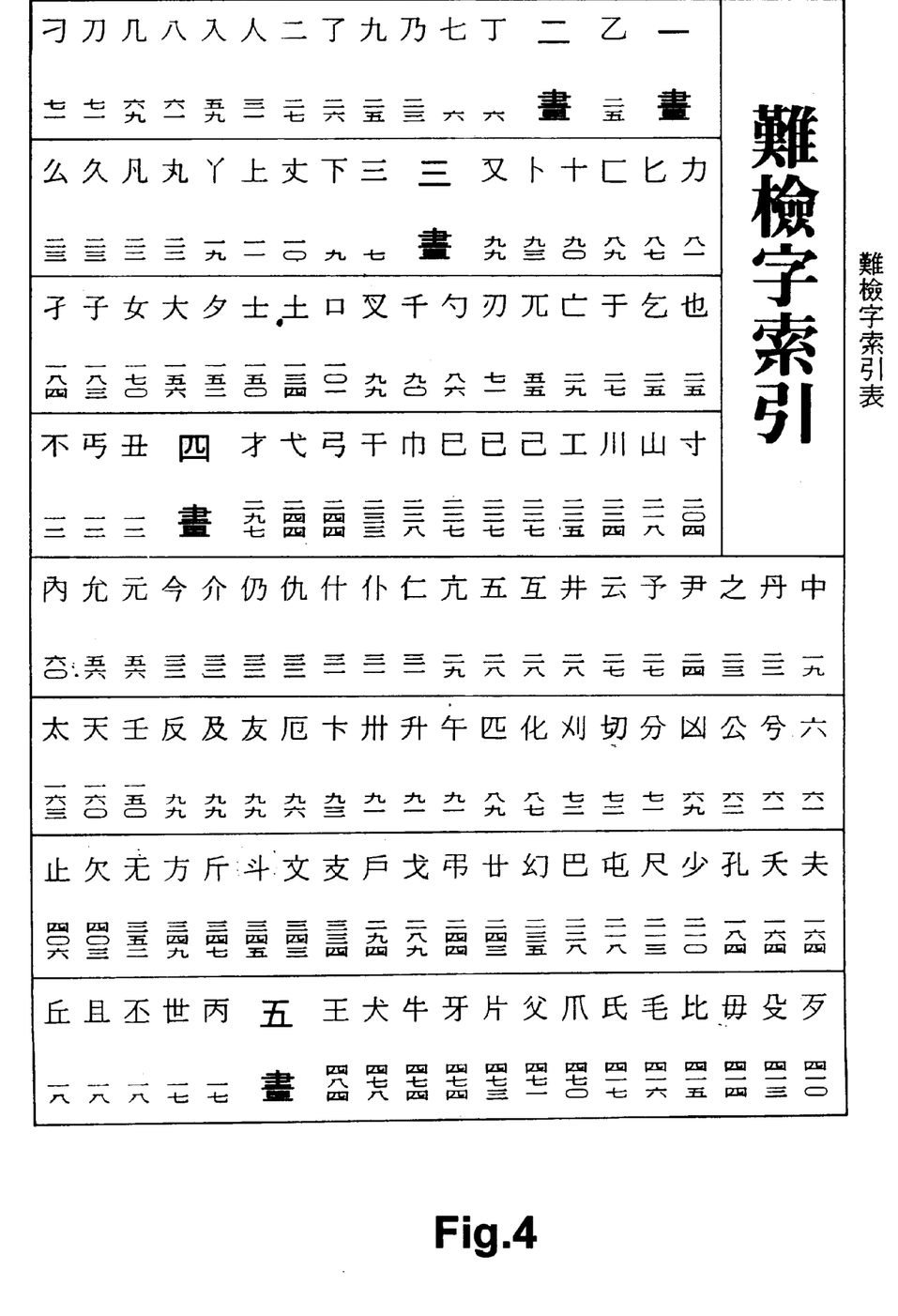
FIG. 4 is a table of hard-to-find characters in a traditional Chinese dictionary

In view of difficulty to find characters with the existing Root-table of FIG. 2 such as those of FIG. 4, this invention uses the strokes that formed all the Chinese characters. The following 26 strokes are the Chinese alphabet that can be used to write any character as the 26 letters in the English alphabet to write any English words.

一 丨 丿 乁 ｜ 丁 乚 丨 乚乚 乛 ㇄/\ ノ ノ 丶 丶 乀 ㇆ 乙 ㇈ 乁 丶 丶

Since every character in a dictionary (with 5,000 or over 40,000 characters) begins with one of the above strokes, the above strokes can be divided into three groups: The horizontal <⎺>, the vertical <|> and slant </> as shown:

<⎺>: 一 丨 丿 乁

<|>: 丨 丁 乚 丨 乚乚 乛

</>: /\ ノ ノ 丶 丶 乀 ㇆ 乙 ㇈ 乁 丶 丶

With the first two or three writing strokes, the form for most characters can be recognized, so that the Roots in the existing Root-Table of FIG. 2 of the Appendix can be divided into three groups based on the first two or three strokes in the root. The roots in the FIG. 3 are listed in the following manner below:

1) The Roots in each group are listed by the first two strokes or the first three strokes according to the handwriting Rules. Roots having same form are listed together. Those with different forms are listed behind them. The following are roots beginning with strokes that are a horizontal and a slant 一/石歹至而 面頁瓦豕牙辰尤卅. The last two roots begin with the same strokes and sequence, but in different forms.

Figure 3:
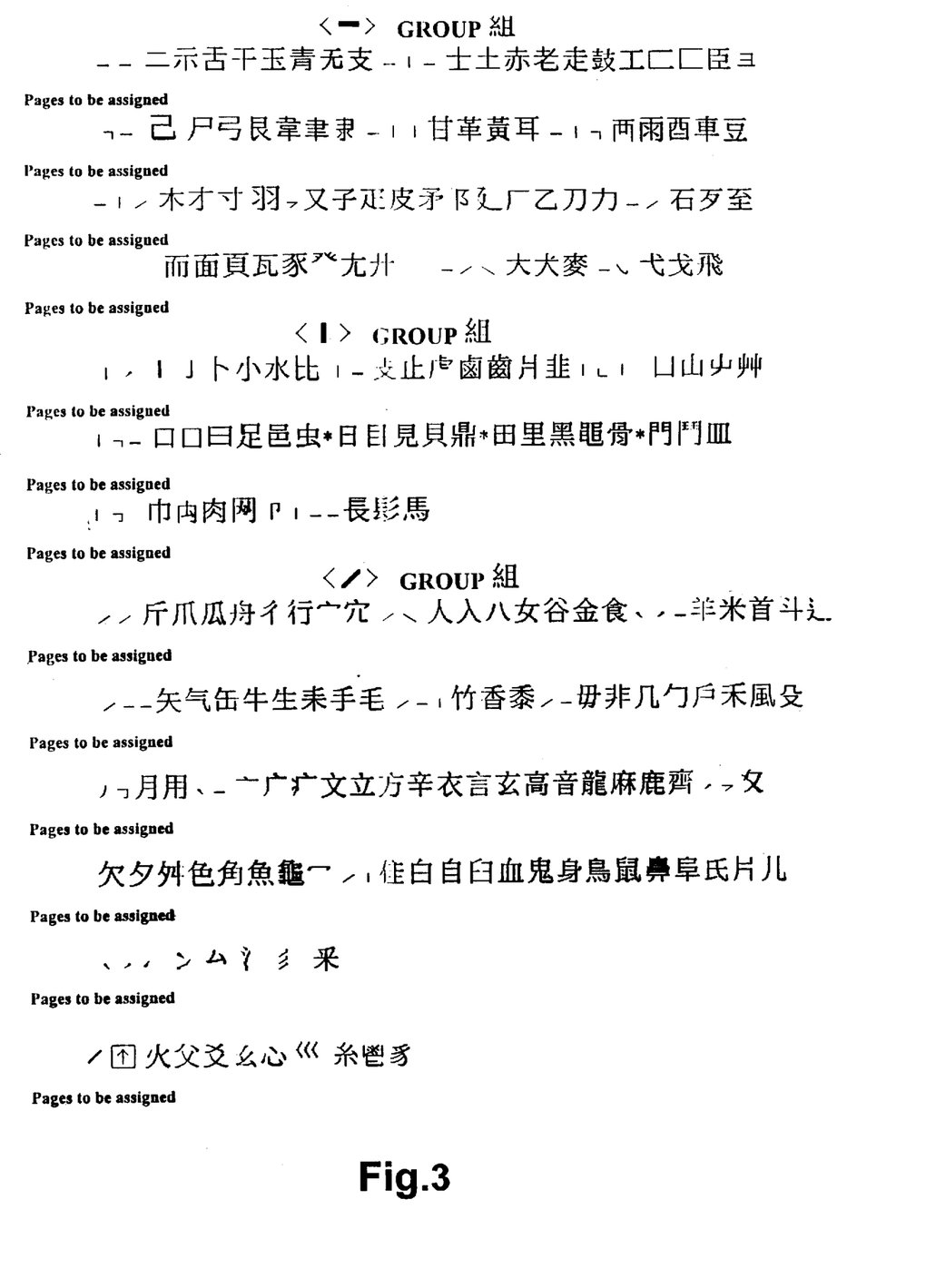
FIG. 3 is a three-stroke root table

2) If a beginning stroke type is shared with many roots, add * to separate those with different forms so that characters are more easily identified, such as (丨ㄱ⎺) in FIG. 3 of the Appendix.

3) The beginning root (head) in a character is defined as the "principal root". All subsequent roots are (body) secondary roots.

Figure 5:
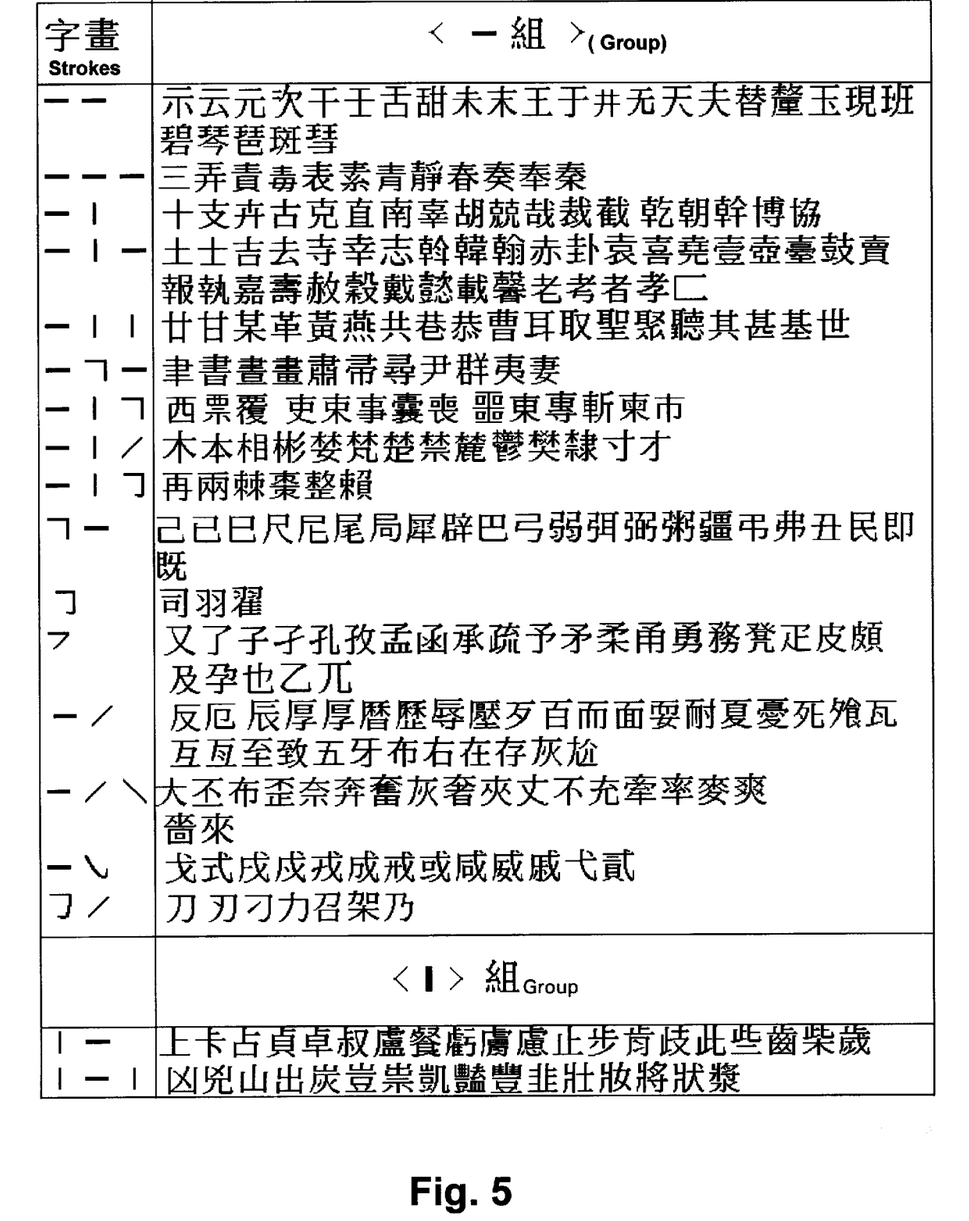
FIG. 5 is a table of hard-to-find characters in a three-stroke dictionary

4) Characters that have the head and body interchanged, such as 妾唐, are listed in two places, one in its original place and the other is in the place where the actual starting root is located. The character 妾 is listed with the root 立 and the root 女. The character 唐 is listed with the root 广 and the root 口. The definition for the character remains with the original root. The actual starting root just lists the page number where the original root is located 5) "Hard To Find Characters 難檢字" are listed as reference without page numbers as in FIG. 5.

Furthermore, the characters in each root type in this new dictionary (Table 3 of the Appendix) are divided into three stroke groups: horizontal <⎺>, the <|> and </>. With these multiple divisions characters in a dictionary can be find more easily.

To look for a character with this invention:

1) Identify the first stroke in the character.

2) Look for this stroke type from among its corresponding stroke groups: <⎺>,<|>,</> in the new Root-Table (FIG. 3), where its root for the character and the page where it is located can be rocognized.

3) Identify the first stroke in the secondary root in the character.

4) Look for the first stroke type from among its corresponding stroke groups: <⎺>,<|>,</> in the page where character is located.

5) Look for the two or three strokes from among its corresponding stroke groups: <⎺>,<|>, </> according to the stroke sequence set forth by traditional Chinese handwriting rules and the character can be found.

In short, the first stroke in the character finds its root and page number. The first stroke in the secondary root finds the location for the character.

For example:

Look for character "Beach 灘".

1) Identify its first stroke, which is the stroke </> in root 氵. This root is a dual root for characters associated with "Water" (水氵). Dual writing roots are common for a number of roots, which all Chinese readers know.

2) (水) is the basic root and the (氵) is the modified root. To look for character in this invention, the basic root is used.

3) Identify first stroke in the character, which is (丨) by handwriting rules. The root (水) and page can be found in the <|> group in the New Table 3 of the Appendix.

4) Identify the first stroke in its secondary root which is (⎺) and the first three strokes for the secondary root (廿) starting strokes are (⎺丨丨). The character Beach (灘) is in the <⎺> group on the page where (水) is in the dictionary.

Figure 6:
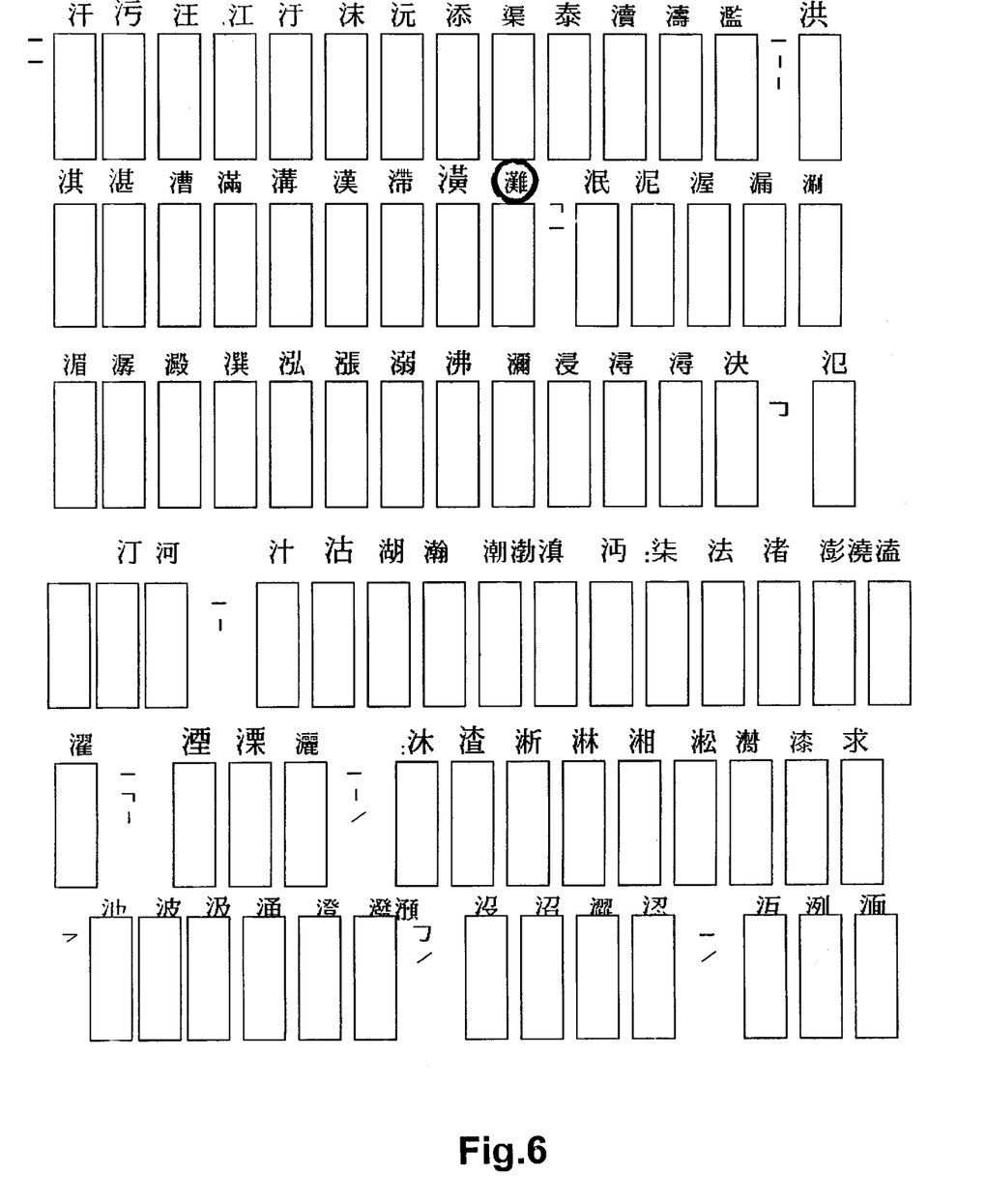
FIG. 6 is a group of characters that are searched to find a particular character pursuant to a three-stroke Chinese dictionary

5) Look for (灘) in the group of characters with (⎺丨丨), see character circled for identification in FIG. 6.

For comparison, to find (灘) the traditional way:

1) Identify the Root for (灘) which is (水).

2) Count the number of strokes of Root (水) which has 4 strokes.

3) From the group of Roots with 4 strokes, (水) and the page (419) where characters with (水) is can be found, see the example in the Root-table in the traditional dictionary, FIG. 2.

4) Go to that page number and count the number of strokes for the remaining strokes in (灘) is 19.

Figure 7:
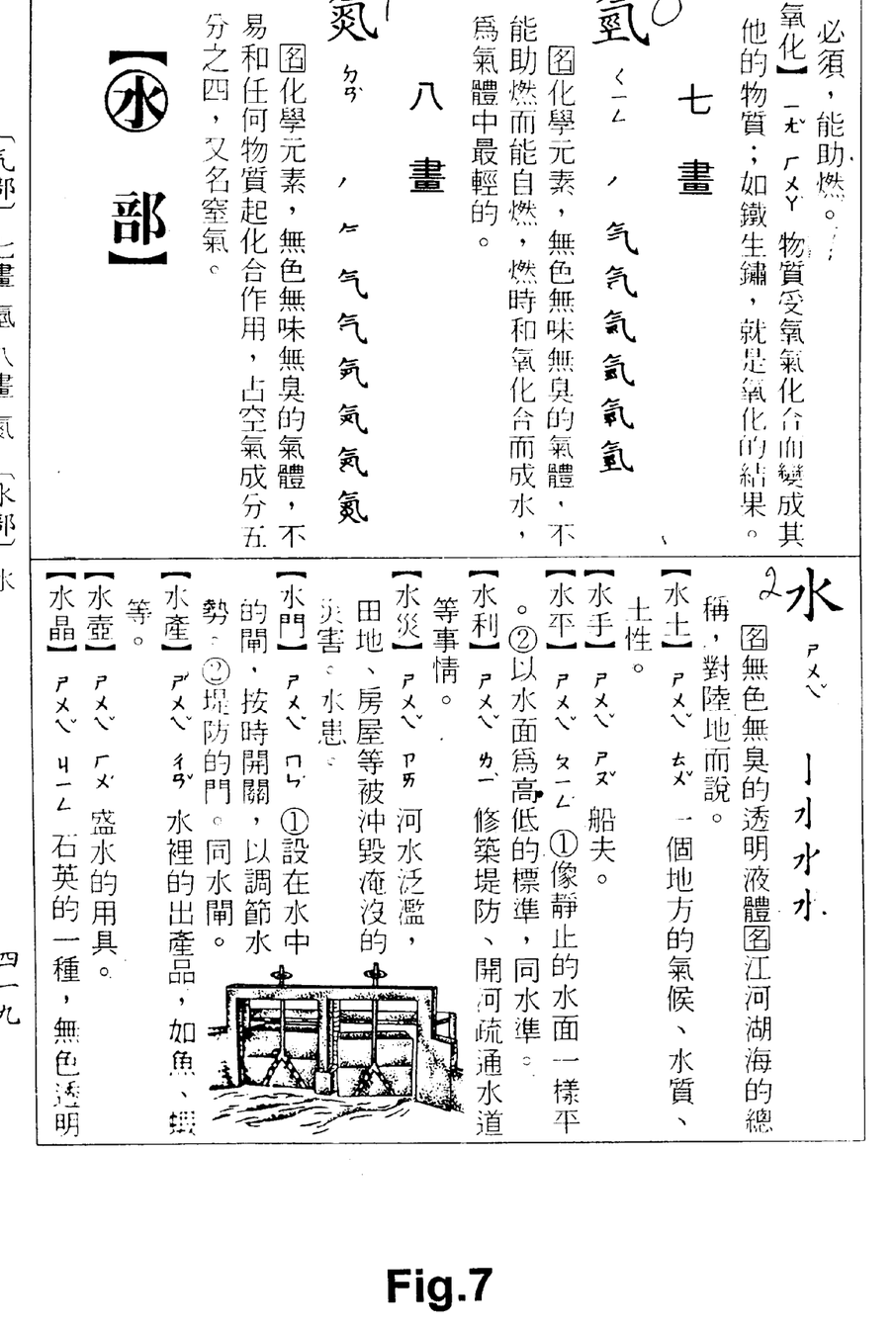
FIGS. 7 and 8 are groups of characters that are searched to find a particular character pursuant to a traditional Chinese dictionary.
Figure 8:
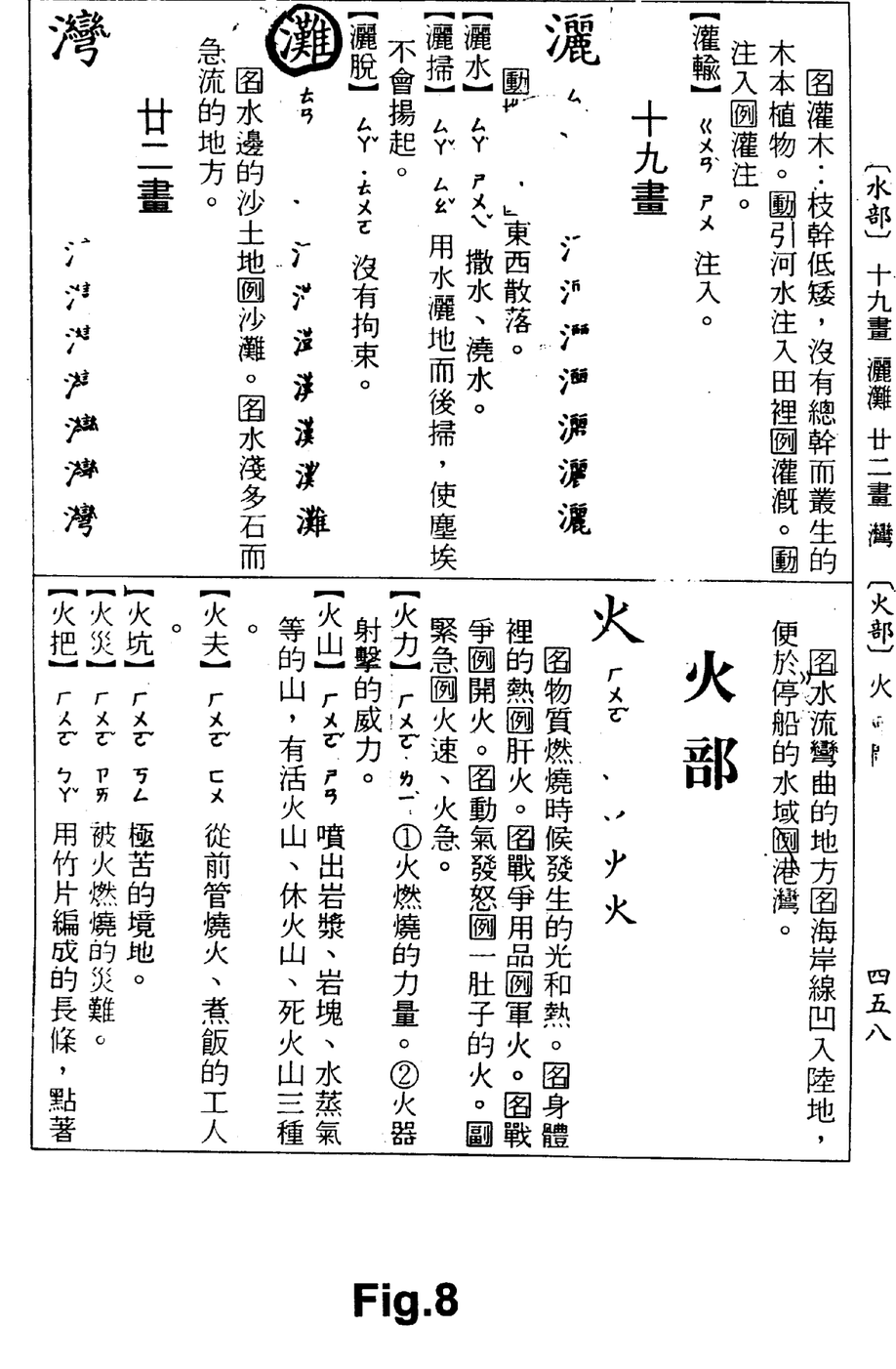

5) Go to the group of characters with 19 strokes and look for (灘), see the example in the traditional dictionary as shown in FIGS. 7 and 8.

The above example for looking for a character is straight forward, but it is not uncommon that number of strokes are often miscounted. If this is the case, the user, by experience, looks for the character before or after the strokes are counted.

The present technique may be written into a computer program that will search for the desired character in accordance with the method. The Chinese dictionary is stored in electronic form.

What is claimed is:

1. A method of using a Chinese dictionary, comprising the steps of (a) selecting a stroke type of a first stroke of a principal root in a desired Chinese Character from among a corresponding stroke group found in a root table, the stroke group being a horizontal stroke, a vertical stroke and a slant stroke, the root table containing a root for the desired Chinese character together with a page where the desired Chinese character is found in the Chinese dictionary, (b) identifying the page from the root table that is associated with the selected stroke type of the first stroke, (c) selecting a stroke type of a first stroke in the secondary root from among the corresponding stroke group, (d) finding on the page a list of Chinese characters associated with the selected stroke type of the first stroke in the secondary root, (e) selecting stroke types of the next one or two strokes in sequence in the secondary root from among the corresponding stroke group, (f) finding a subsidiary list of Chinese characters form the list that are associated with the selected stroke types of the next one or two strokes, and (g) identifying the desired Chinese character within the subsidiary list of Chinese characters.

2. A method as in claim 1, further comprising identifying text associated with the identified Chinese character that conveys a meaning for the desired Chinese character.

3. An apparatus that uses Chinese dictionary in electronic form, comprising a selector of a stroke type of a first stroke of a principal root in a desired Chinese Character from among a corresponding stroke group found in a root table, the stroke group being a horizontal stroke, a vertical stroke and a slant stroke, the root table containing a root for the desired Chinese character together with a page where the desired Chinese character is found in the Chinese dictionary, an identifier of a page from a root table that is associated with the selected stroke type of the first stroke, a selector of a stroke type of a first stroke in the secondary root from among the corresponding stroke group; a finder on the page of a list of Chinese characters associated with the selected stroke type of the first stroke in the secondary root a selector of stroke types of the next one or two strokes in sequence in the secondary root form among the corresponding stroke group, a finder of a subsidiary list of Chinese characters from the list that are associated with the selected stroke types of the next one or two strokes, and an identifier of the desired Chinese character within the subsidiary list of Chinese characters.

* * * * *

UNITED STATES PATENT AND TRADEMARK OFFICE
CERTIFICATE OF CORRECTION

PATENT NO. : 6,219,448 B1  
DATED : April 17, 2001  
INVENTOR(S) : Gim Yee Pong and Wai Jean Pong Page 1 of 1

It is certified that error appears in the above-identified patent and that said Letters Patent is hereby corrected as shown below:

Title page,
In the Figure of the patent and in Fig. 1, in the box located in the fifth column from the left and the tenth row from the top "⃞⃞" should be deleted and replaced with --⃞⃞--.

Column 4,
Line 37, "⃞" should be deleted and replaced with --⃞--.

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*